Sept. 10, 1935.  J. VERDERBER ET AL  2,014,155
CLAMP OPERATING AND LOCKING MEANS
Filed May 19, 1930
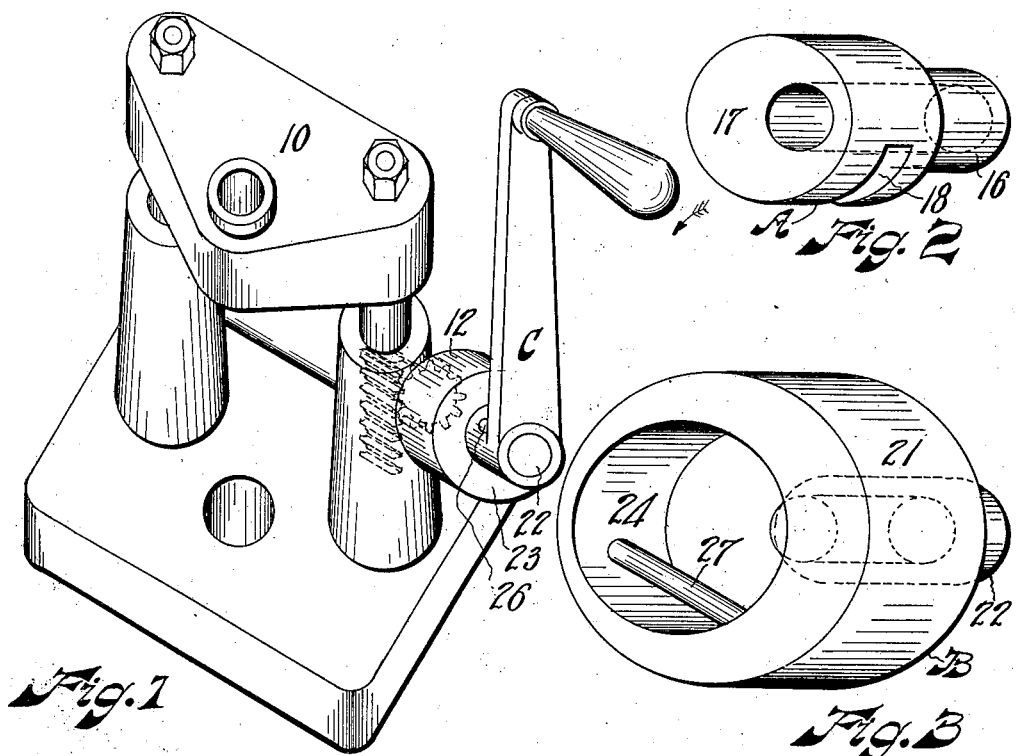
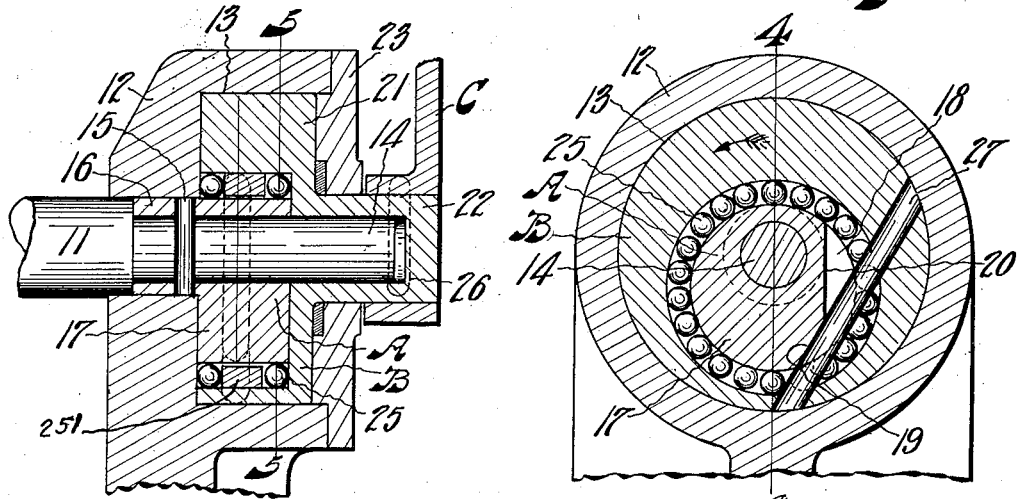
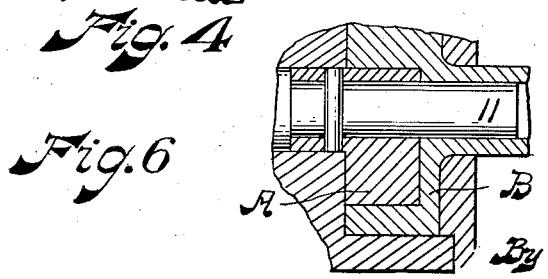
INVENTORS
E. F. Batterman
and
J. Verderber
By C. T. Heinkel ATTORNEY Patented Sept. 10, 1935

2,014,155

UNITED STATES PATENT OFFICE 2,014,155

CLAMP OPERATING AND LOCKING MEANS

Joseph Verderber, Cleveland, and Elmer F. Batterman, East Cleveland, Ohio

Application May 19, 1930, Serial No. 453,841

15 Claims. (Cl. 192—8)

Our invention relates to means or structures whereby a clamp mechanism is operated and locked after a clamping operation is completed and released thereafter.

An object of our invention is to provide a simple and easily operable and efficient clamping and locking and releasing means.

Another object of our invention is automatic locking of a clamping means when a clamping operation is completed and automatic release of the locking before the clamping is released.

Another object of our invention is a limit means to prevent excessive locking of a clamping means.

Another object of our invention is a means to easily effect clamping, to easily lock the clamping, to easily release the locking, and to easily release the clamping.

Another object of our invention is a clamp moving and locking and releasing effected by wedging between two eccentrically related members both rotatable on the same axis.

Other objects will appear in this specification and will become obvious or apparent or will suggest themselves upon an inspection of the accompanying drawing and this specification.

In such devices as jigs for example, there is a clamping means or mechanism to fix articles in the jig and this clamping means must be locked to retain the article in position while a machining operation is being performed on the article and the locking must be released for release of the article after machining.

Various devices have been made for such purposes but they are either too expensive, or require time consuming extra operations, or lock and clamping means too tight for efficient or time or effort saving release and locking, or have various other defects.

The present invention aims to reduce to a minimum the defects now in the art and to improve the art.

For illustration but not for limitation purposes, we have shown in the accompanying drawing one certain jig device with our invention applied thereto but we are aware that our invention can also be applied to other devices.

In the accompanying drawing mentioned above:

Fig. 1 is a perspective view of a certain jig device having my invention applied thereto.

Fig. 2 is a perspective view of one of the clamp operating and locking members.

Fig. 3 is a perspective view of another one of the clamp operating and locking members.

Fig. 4 is a section of the clamp operating and locking means taken in a vertical plane indicated by the line 4—4 in Fig. 5.

Fig. 5 is a section of the clamp operating and locking means taken in a vertical plane indicated by the line 5—5 in Fig. 4.

Fig. 6 is a fragmental section showing a modification of the joint between the eccentric members.

Similar reference characters refer to similar parts throughout the views.

The jig device shown is of a usual type having the clamping member 10 operated by the shaft 11 through a geared relation between the same.

The housing 12 is a fixed part of the jig structure and has the counterbore 13 concentric with the axis of the shaft 11.

An eccentric member, represented by the member A, is mounted on the diametrically reduced portion 14 of shaft 11 by means of the pin 15 for rotation with the shaft and has the hub 16 journaled in the housing and the eccentric part 17 having the groove or slot 18 therein; the bottom of the groove or slot comprises the abutment portions 19 and 20 angular with each other.

An eccentric member, represented by the member B, has the diametrically larger part 21 journaled in the counterbore 13 and also has the diametrically smaller hub 22 journaled on the reduced shaft portion 14 and also journaled in the cap 23 which closes the counterbore and confines the members in the counterbore longitudinally of the shaft.

The so far mentioned journals for the member B are all concentric with the axis of the shaft.

The part 21 of the member B has the counterbore 24 eccentric with the axis of the shaft so that a part of the part 21 extends over the part 17.

Rollable or antifriction members represented by the balls 25 are introduced between the eccentric part 17 of the member A and the circumferential wall of the counterbore 24 of the member B. The spacer 251 is introduced between the two rows of balls to keep the balls of each row in a circular path. The spacer, preferably fits loosely into the counterbore 24 and also fits loosely between the two rows of balls to allow the balls a little play or diversion from a strictly circular path thereof and thereby mitigate a groove from being worn by the balls either in the hub 16 or in the circular wall of the counterbore 24. This also cheapens construction since no close machining and fitting will be necessary.

The crank or handle C is secured to the hub 22 of the member B by means of the pin 26.

The pin 27, an element of the driving means, is fixed in the part 21 of the member B in such a position that a part thereof extends through the groove or slot 18 and is contactable on the portions 19 and 20, according to the rotation of the member A and subtends the member A as shown.

The anti-friction members and the spacer 251 can be eliminated when the question of friction is not important. In such structure, the circular wall of the counterbore 24 contacts the external surface of the member A as seen in Fig. 6.

The rollable or anti-friction members are introduced to effect an easy locking or wedging and an easy release of the locking or wedging and to minimize lubrication required since excessive or even necessary lubrication for members in direct wedging contact may cause a loosening of the wedging when the device is in use and no lubrication between members in direct wedging contact may cause cutting and defective operation of the device. The rollable or anti-friction members require very little lubrication and can operate without lubrication and will always wedge the eccentric members even if an excess of lubricant is present.

The device is shown in the drawing with the clamp operating and locking parts related as seen in Fig. 5.

A rotation of the handle or crank in the direction of the arrow in Fig. 1 rotates the member B in the direction shown by the arrow thereon and on the axis of the shaft.

During the first part of this rotation the slack or clearances between the balls, or between the contacting surfaces of the members A and B, is taken up and the pin 27 recedes from the portion 19 of the bottom of the groove or slot in the member A and moves toward the portion 20 thereof.

When the slack is taken up, the balls connect the members A and B, or the eccentric surfaces of the members A and B are contacted lightly when no rollable or anti-friction means is used, a further rotation of the crank in the same direction rotates the members A and B in unison and thereby rotates the shaft and moves the clamping member until the same contacts an article in the jig.

The article now offers resistance against further movement of the clamping member and against further rotation of the shaft.

A further rotation of the crank, in the same direction, rotates the member B further and tends to rotate the member A against the resistance thereon and thereby clamps the clamping member more tightly against the article until the same is clamped sufficiently tight.

While so clamping the article, a resistance against rotation of the shaft is created while the member B can rotate further. Upon further rotation of the member B, the balls are increasingly wedged sidewise between the members A and B, or the eccentric surfaces of the contact members are increasingly wedged sidewise against each other when no balls or rollable members are used, and thereby automatically create locking friction between one side of the outer circumferential surface of the member B and one side of the housing and between one side of the member B and one side of the shaft and between one side of the hub of the member B and one side of the bore in the cap 23 and between one side of the hub 16 and the bore therefor in the housing and between one side of the shaft and one side of the bearing thereof in the housing and thereby locks the shaft and the clamping member against reverse movement or against release of the article.

When the member B is so rotated for locking and when the article is sufficiently clamped, the pin 27 has moved close to or into contact with the portion 20 of the groove in the member A and thereby forms a stop or abutment or limiting means of relative movement between the members A and B and thereby practically locks the two members together so that the same could move or rotate only in unison if a movement or rotation is possible, but since the mechanism is now locked and the article prevents any further movement of the members A and B, the abutment of the pin 27 on the bottom of the groove stops all further or excessive locking of the clamp operating and locking means to prevent the same from being locked or wedged too tight and to permit the locking to be released with comparative ease.

This part of the operation automatically locks the clamp operating means during the clamping of the article and automatically prevents overlocking.

Upon rotation of the crank in reverse direction, the member B is first rotated independently and the balls roll in between the members A and B and thereby easily and automatically release the locking and, upon further rotation of the member B, the pin 27 contacts the portion 20 of the groove in the member A and thereby rotates the member A and the shaft thereon and thereby moves the clamping member away from the article.

In our invention, the structure is very simple to minimize cost of production; clamping of an article and locking of the clamping means and release of the locking is effected with a minimum of effort on the crank; the locking and the release thereof are effected automatically; and the locking is limited to prevent excessive locking.

As mentioned above, we are aware that our invention can be applied to devices other than the one illustratively shown in the drawing and specifically and exclusively described in this specification. We are also aware that changes and modifications can be made in the structure and arrangement of the parts of the one device shown and described within the spirit and intent of the appended claims. Therefore, without limiting ourselves to the precise application of our invention as shown and described nor to the precise structure and arrangement of the parts as shown and described.

We claim:

1. A clamp operating and locking means comprising a rotatable shaft for operating a clamping means, a member on and rotatable with said shaft and having an eccentric part, and a member rotatable on said shaft and having an eccentric part extending over the first mentioned part, and a handle to rotate said rotatable member for a work clamping operation and locking engagement of said part thereof with the first said part.

2. A clamp operating and locking means comprising a rotatable clamping means operating shaft having an eccentric part, a rotatable member having an eccentric part, an abutment member fixed in said part on said rotatable member and a portion thereof extending into a cut out in said part on said shaft, and a handle to rotate said rotatable member for a work clamping operation and releasable locking thereof of said parts against voluntary release thereof.

3. A clamp operating and locking means comprising a rotatable clamping means operating shaft having an eccentric part, a rotatable member having an eccentric part, an anti-friction means between said parts, an abutment mechanism between said parts for limitation of movement between the same, and means for rotation of said rotatable member for clamp operation and locking thereof.

4. A clamp operating and locking means comprising a rotatable clamping means operating shaft having an eccentric part, a rotatable member having an eccentric part in clamp operating and locking relation with the first said part, a pin through said eccentric of the rotatable member, a groove in said eccentric part on the shaft and having the bottom thereof adapted to engage said pin upon rotation of said rotatable member in either direction, and means for rotation of said rotatable member for clamp operation and locking thereof.

5. A clamp operating and locking means comprising a pair of members eccentrically related for releasable wedging thereof and a row of rolling members between the members of said pair of members to facilitate the wedging and the release thereof.

6. A jig comprising a work clamping means including an operable shaft and operating means therefor and a locking means for said operating means comprising a pair of eccentric members, one rotatable with said shaft, the other rotatable on said shaft, both adapted for wedgingly locking said operating means against reverse movement upon completion of a one directional operation of said shaft operating means.

7. A clamp operating and locking means comprising a rotatable shaft to operate the clamp operating means, an eccentric member on and rotatable with said shaft, an operating handle for said shaft, an eccentric member embracing the firstly mentioned eccentric member and journaled on said shaft and rotatable with said handle, and a pin fixed to and traversing the secondly mentioned eccentric member, subtending an arc of the firstly mentioned eccentric member and adapted to engage the firstly mentioned eccentric member to rotate the same positively in either rotative direction upon operation of said handle.

8. A clamp operating and locking means comprising a pair of members eccentrically related, one embracing the other, for attaining a wedging relation between the same, one moving the other through said wedging relation for clamp movement, and a driving pin traversing one of said members and subtending an arc of the other for directly engaging the other, after said clamp movement, to increase the wedging of said members and thereby lock the clamp against reverse movement.

9. A clamp operating and locking means comprising a rotatable shaft to operate the clamp, an eccentric member on and rotatable with said shaft, an operating handle for said shaft, an eccentric member embracing the firstly mentioned member and journaled on said shaft and rotatable with said handle, and a driving means for the device including a pin fixed in the secondly mentioned eccentric member and, upon rotation of the secondly mentioned eccentric member, engages the firstly mentioned eccentric member to rotate said shaft for a clamping movement of the clamp and said pin thereafter engaging the firstly mentioned eccentric member directly to wedge said eccentric members for locking thereof in one direction upon a one directional operation of said handle and engaging the firstly mentioned member directly to release the wedging engagement between said eccentric members for an unclamping movement of the clamp upon operation of said handle in the opposite direction.

10. A device of the class described comprising a reciprocatory clamping member, a rotatable shaft, a gear mounted on and rotatable with said shaft for effecting reciprocation of said clamping member, an eccentric member fixed on said shaft, a second eccentric member in embracing relation to the firstly mentioned eccentric member for effecting wedging between said eccentric members upon rotation of said shaft, and a pin fixed in said second eccentric member and subtending an arc of the firstly mentioned eccentric member for locking said shaft against reverse rotation when said clamping member meets with resistance to movement thereof.

11. A clamp operating and locking means comprising a pair of members eccentrically related one over the other for wedging therebetween and a stop means comprising a pin traversing one of said members and subtending an arc of the other.

12. A clamp operating and locking means comprising a pair of members eccentrically related one over the other for wedging therebetween, one moving the other in one direction for operating and locking a clamp and in another direction for releasing the locking and the clamp and a stop pin permanently fixed in said one member and extending into a slot in and subtending an arc of the other for limiting the extent of the wedging.

13. A device of the class described comprising a reciprocatory clamping member, a rotatable shaft for effecting a reciprocation of said clamping member, an annular member mounted eccentrically on said shaft, a second annular member embracing the firstly mentioned annular member eccentrically thereof, and a driving means including a pin fixed in said second annular member at one side of the axis thereof and extending through a slot subtending an arc of the firstly mentioned annulair member to move said annular members into frictional engagement with each other to move the same in unison and to move the same relatively and thereby lock said rotatable member against reversing thereof when said clamping member meets with resistance to movement thereof.

14. A device of the class described comprising a clamping member, a driving means for moving said clamping member into clamping relation with the object to be clamped, eccentric members carried by said driving means and relatively rotatable to bring the same into a wedging relation, and said driving means including a pin fixed in one of said eccentric members and extending through a slot subtending an arc of the other of said eccentric members for intensifying the wedging relation and thereby lock said moving means against reverse movement when said clamping member meets with resistance to movement thereof.

15. A device of the class described comprising a clamping member, a rack on said clamping member, a shaft, a gear on said shaft meshing with said rack for effecting reciprocation of said clamping member upon rotation of said shaft in opposite directions, an annular member eccentrically mounted on said shaft, a second annular member embracing the firstly mentioned annular member eccentrically thereof and in wedge forming relation therewith, and means for intensifying the wedging for locking said annular members against reverse movement when said clamping member meets with resistance to movement thereof comprising a pin fixed in said second annular member and traversing the same at one side of the axis thereof and extending through a slot subtending an arc of the firstly mentioned member.

JOSEPH VERDERBER.
ELMER F. BATTERMAN.